United States Patent [19]

Ishikawa et al.

[11] Patent Number: 5,106,401
[45] Date of Patent: * Apr. 21, 1992

[54] PROCESS FOR THERMAL TREATMENT OF GLASS FIBER PREFORM

[75] Inventors: Shinji Ishikawa; Yuichi Ohga; Ichiro Tsuchiya; Hiroo Kanamori; Hiroshi Yokota; Michihisa Kyoto, all of Yokohama, Japan

[73] Assignee: Sumitomo Electric Industries, Ltd., Osaka, Japan

[*] Notice: The portion of the term of this patent subsequent to Nov. 13, 2007 has been disclaimed.

[21] Appl. No.: 544,942

[22] Filed: Jun. 28, 1990

[30] Foreign Application Priority Data

Jun. 29, 1989 [JP] Japan .................. 1-167695

[51] Int. Cl.$^5$ .................................. C03C 25/02
[52] U.S. Cl. ...................... 65/3.12; 65/900; 65/18.2; 65/2; 65/DIG. 16
[58] Field of Search ............. 65/3.11, 3.12, 3.14, 65/3.15, 18.2, 900, DIG. 16, 2

[56] References Cited

U.S. PATENT DOCUMENTS

| | | | |
|---|---|---|---|
| 3,933,454 | 1/1976 | DeLuca | 65/900 |
| 4,125,388 | 11/1978 | Powers | 65/900 |
| 4,126,436 | 11/1978 | Bailey | 65/13 |
| 4,298,365 | 11/1981 | Bailey et al. | 65/18.4 |
| 4,450,333 | 5/1984 | Andrejco et al. | 65/13 |
| 4,629,485 | 12/1986 | Berkey | 65/18.2 |
| 4,772,302 | 9/1988 | Abe | 65/3.12 |
| 4,969,941 | 11/1990 | Kyoto et al. | 65/30.1 |

FOREIGN PATENT DOCUMENTS

| | | |
|---|---|---|
| 161680 | 11/1985 | European Pat. Off. . |
| 201937 | 11/1986 | European Pat. Off. . |
| 232077 | 8/1987 | European Pat. Off. . |
| 302121 | 2/1989 | European Pat. Off. . |
| 58-058299 | 12/1983 | Japan ................ 65/900 |
| 60-145923 | 8/1985 | Japan . |
| 61-026522 | 2/1986 | Japan . |
| 61-201634 | 9/1986 | Japan . |
| 61-215226 | 9/1986 | Japan . |
| 1-183430 | 7/1989 | Japan . |
| 2-069328 | 3/1990 | Japan . |
| 2203737 | 10/1988 | United Kingdom . |

OTHER PUBLICATIONS

Patent Abstracts of Japan, vol. 11, No. 30, (c-400) [2477], Jan. 29, 1987, Japanese Kokai 61-210634

Primary Examiner—Kenneth M. Schor
Assistant Examiner—John J. Bruckner
Attorney, Agent, or Firm—Cushman, Darby & Cushman

[57] ABSTRACT

The present invention provides a process for the dehydrating and purifying treatment by heating a porous glass preform for an optical fiber by passing the porous glass preform through a muffle tube having a SiC layer at least on its inner surface at a high temperature under an atmosphere containing an inert gas and a silicon halogenide gas;

a process for the fluorine-doping treatment by heating a porous glass preform for an optical fiber by passing a porous glass preform through a muffle tube having a SiC layer at least on its inner surface at a high temperature under an atmosphere containing a fluorine compound gas and an inert gas; and a process for the vitrifying treatment by heating a porous glass preform for an opticla fiber by passing the preform, which has been previously dehydrated and purified, through a muffle tube having a SiC layer at least on its inner surface at a high temperature under an atmosphere gas.

8 Claims, 4 Drawing Sheets

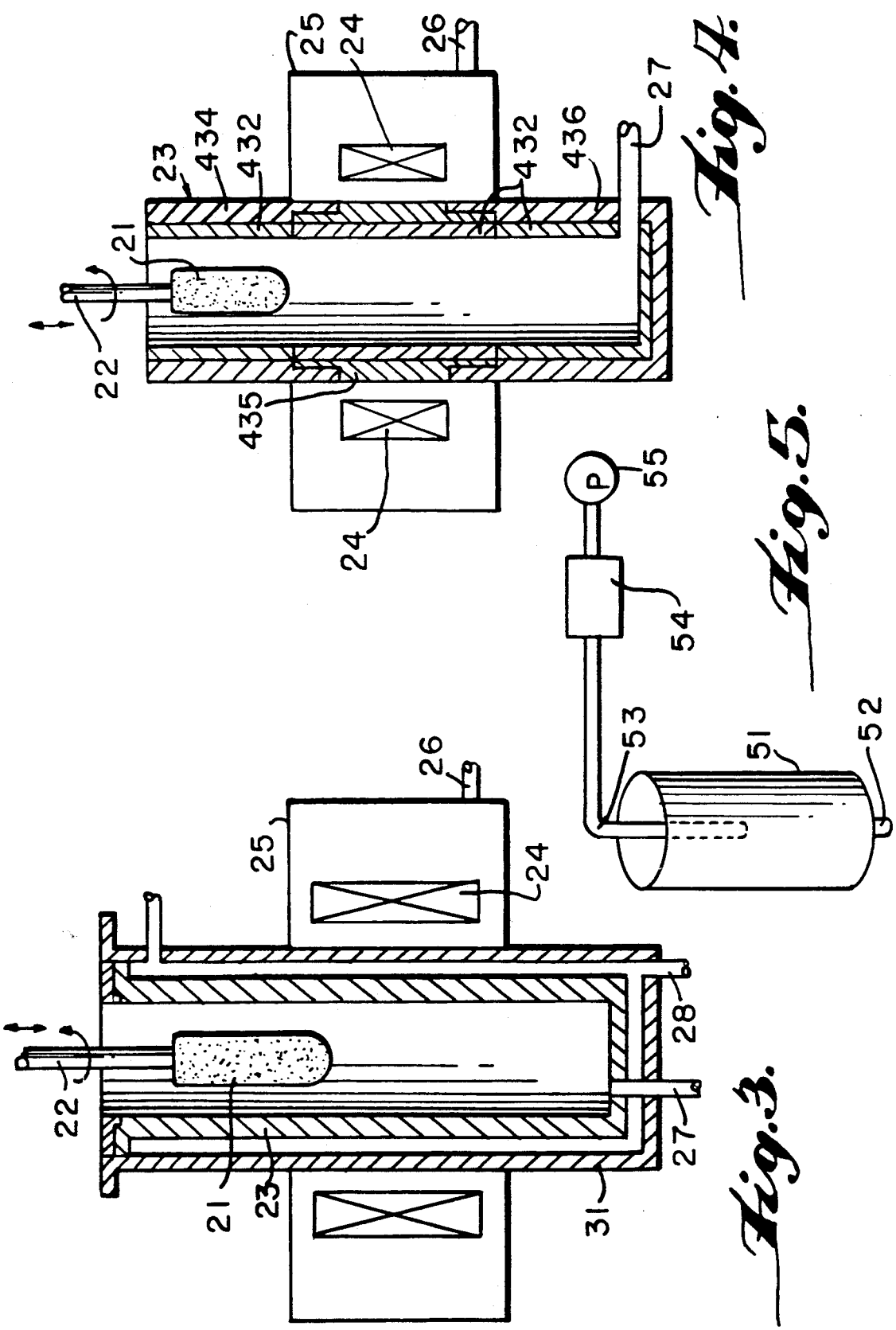

PROCESS FOR THERMAL TREATMENT OF GLASS FIBER PREFORM

BACKGROUND OF THE INVENTION

1. Field of the Invention

The present invention relates to a process for the thermal treatment of a porous glass preform for the production of an optical fiber preform.

2. Description of the Related Art

A preform for an optical fiber is generally produced by forming a cylindrical or an annular porous preform by the Vapor Phase Axial Deposition method or the Outside Chemical Vapor Deposition method and heating, dehydrating and sintering the porous preform in a heating furnace under an atmosphere of an inert gas such as argon or helium, a chlorine based gas or a fluorine based gas to produce a transparent and highly pure preform for the optical fiber.

An operating temperature of the furnace depends on a kind of a dopant to be doped and a content of the dopant in the preform, and it is generally in the range of 1200° to 1600° C. Since impurities tend to contaminate in the preform at such high temperature, a muffle tube made of a high purity quartz is typically used in the furnace to prevent the contamination. However, the quartz made muffle tube tends to rapidly get brittle due to devitrification, that is, transition from a glass phase to a crystal phase at a high temperature, and thus it is poor in durability.

Recently, a carbon made muffle tube an inner surface of which is coated with silicon carbide (SiC) is often used in a heating furnace. The carbon made muffle tube can be operated at a higher temperature than the quartz made one and SiC improves a gas impermeability and oxidation resistance of the muffle tube.

Further, in order to prevent a reaction between SiC and a reactive gas, the SiC coating on the carbon made muffle tube is treated with oxygen to form a $SiO_2$ layer on the SiC coating (see Japanese Patent Kokai Publication No. 201634/1986).

The prior art as described above have following problems:

(1) When the quartz made muffle tube is used, it is softened and deformed at a temperature above 1400° C. In addition, the temperature of the muffle tube cannot be lowered to a temperature below a crystal transition point (lower than 300° C.) because of crystal (cristobalite) formation at a temperature above 1200° C. Thus, once the muffle tube is heated, it should be used continuously without lowering the temperature thereof.

(2) When a SiC made or SiC coated muffle tube is used, SiC reacts with a halogen based gas as a reactant to form a porous carbon, whereby the muffle tube becomes poor in gas tightness so that the halogen based gas leaks outside from the muffle tube.

(3) In the case where the muffle tube having the $SiO_2$ layer on the SiC coating is used, thermal expansion coefficients of SiC and $SiO_2$ are greatly different from each other and thereby the $SiO_2$ layer in a thickness in the order of some microns tends to crack. Then, a gas permeates through the crack and it is impossible to stably produce the preform for a long period.

SUMMARY OF THE INVENTION

It is an object of the present invention to provide a process of the thermal treatment for the stable production of an optical fiber preform for a long period from which preform an optical fiber having a low transmission loss can be drawn.

The present invention provides a process of the thermal treatment of a porous glass preform for an optical fiber comprising heating the preform in a heating apparatus which comprises a muffle tube having a SiC coating at least on an inner surface thereof in an atmosphere for effecting the thermal treatment.

The term "thermal treatment" is intended to mean any treatment in which the preform is heated. For example, a sintering treatment, a dehydrating and purifying treatment, a fluorine-doping treatment and a vitrifying treatment of the preform are included in such thermal treatment.

In a first aspect, the present invention provides a process for the dehydrating and purifying treatment by heating a porous glass preform for an optical fiber comprising supporting or passing the preform in or through a muffle tube having a SiC layer at least on its inner surface at a high temperature under an atmosphere comprising an inert gas and a silicon halogenide gas or an atmosphere comprising an inert gas, a silicon halogenide gas and a halogen based gas.

In a second aspect, the present invention provides a process for the fluorine-doping treatment by heating a porous glass preform for an optical fiber comprising supporting or passing the preform in or through a muffle tube having a SiC layer at least on its inner surface at a high temperature under an atmosphere comprising a fluorine compound gas and an inert gas.

BRIEF DESCRIPTION OF THE DRAWINGS

FIGS. 1 to 4 and 7 each schematically shows a sectional view of an heating furnace in which the present invention is carried out, FIG. 5 schematically shows an apparatus for measuring an oxygen concentration in a muffle tube.

DETAILED DESCRIPTION OF THE DRAWINGS

The present invention will be described in detail with reference to the accompanying drawings.

Now, the first aspect of the present invention is explained.

Figure 1:
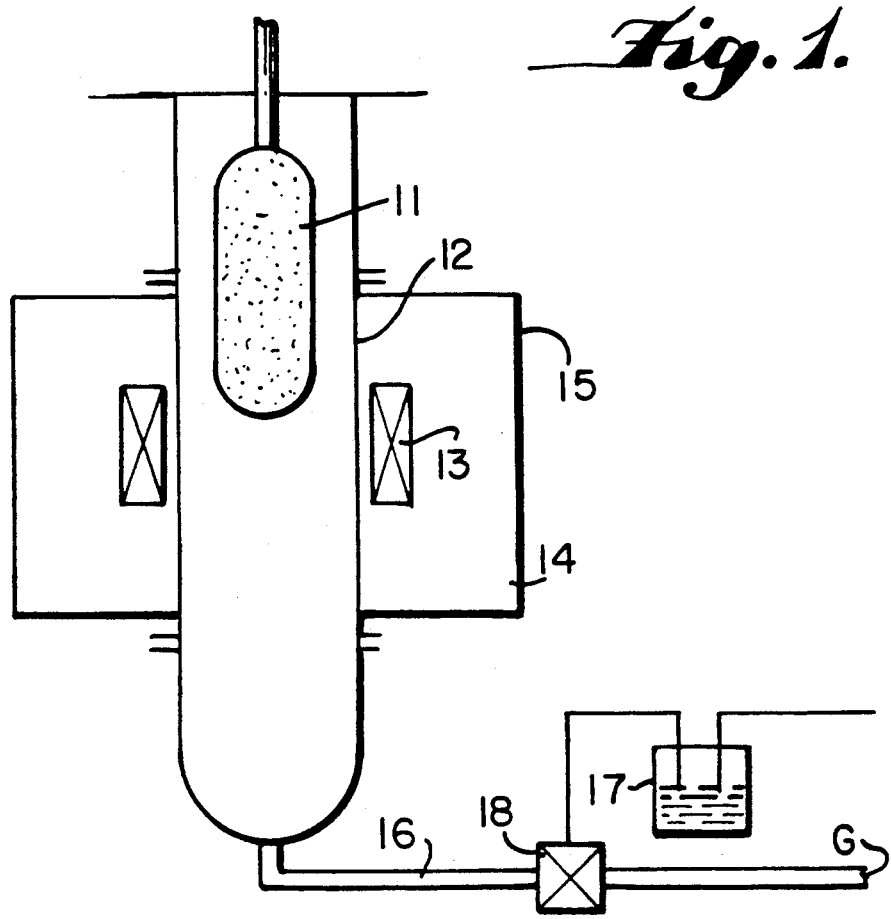

FIG. 1 schematically shows a sectional view of one embodiment of a heating apparatus in which the process of the present invention is carried out. The apparatus comprises a muffle tube 12 in which a porous glass preform 11 is inserted and a furnace body 15 around the muffle tube 12 comprising a heater 13 to heat the glass preform 11 and an insulation 14 to prevent heat loss. A dehydrating and purifying gas used for dehydrating and purifying the preform is supplied through a line 16 connected with the muffle tube. In addition, a silicon halogenide gas generated in a bubbler 17 is mixed with the other dehydrating and purifying gas G in a gas mixer 18. The muffle tube is made of carbon and coated with a SiC layer. Further, the SiC layer is coated with a $SiO_2$ layer. Each layer can be formed in a conventional manner.

The term "dehydrating and purifying gas" is intended to mean a gas mixture of an inert gas such as helium (He), Argon (Ar) and nitrogen ($N_2$) with a silicon halogenide gas and optionally a halogen based gas.

The present invention has been conceived on the basis of the following experiments:

EXPERIMENT 1

A carbon made plate coated with SiC in a thickness of 100 μm was heated at 1500° C. under an atmosphere of the dehydrating and purifying gas containing 2.5 parts by volume of $SiCl_4$ relative to 100 parts by volume of the inert gas (He) for 10 hours.

After heating, a weight loss of the SiC coating was determined to be as small as 1%. A specific surface area of the SiC coating was 0.1 m²/g, which was substantially equal to that of the SiC coating before heating.

EXPERIMENT 2

Experiment 1 was repeated except that the dehydrating and purifying gas contained 3 parts by volume of $SiCl_4$ and 1 part by volume of $Cl_2$ each relative to 100 parts by volume of the inert gas.

After heating, the weight loss of the SiC coating was determined to be as small as 1.4%. The specific surface area of the SiC coating was 0.15 m²/g, which was substantially equal to that of the SiC coating before heating.

EXPERIMENT 3

Experiment 1 was repeated except that the dehydrating and purifying gas contained 5 parts by volume of $Cl_2$ relative to 100 parts by volume of the inert gas.

After heating, the weight loss of the SiC coating was determined to be as large as 71%. This means that SiC was completely decomposed. The specific surface area of SiC was 800 m²/g and large pores having a diameter of 30 Å were found.

From the above Experiments, the following results can be induced:

(1) At a high temperature, SiC reacts with $Cl_2$ and does hardly with $SiC_4$.
(2) The reaction between SiC and $Cl_2$ can be suppressed when $SiCl_4$ is added to $Cl_2$ in the dehydrating and purifying gas.

Thus, in order to prevent the degradation of the SiC coating due to $Cl_2$, the dehydrating and purifying treatment is preferably carried out under an atmosphere of $SiCl_4$ or an atmosphere of $Cl_2$ mixed with $SiCl_4$. Those considerations can be expressed according to the following equilibrium equation:

$$SiC + 2Cl_2 \longrightarrow SiCl_4 + C \quad (1)$$

The above equation indicates the degradation of SiC by $Cl_2$. Therefore, in order to suppress the degradation, a concentration of the product $SiCl_4$ is increased on the basis of an equilibrium relation expressed by an equilibrium constant $Kp = [C_{SiCl_4}]^{\frac{1}{2}}/[Cl_2]$.

When a gas mixture of the inert gas and the silicon halogenide gas is used as the dehydrating and purifying gas, 0.3 to 10 parts, preferably 2 to 5 parts by volume of the halogenated gas is used relative to 100 parts by volume of the inert gas. When a ratio of the silicon halogenide gas is less than 0.3 parts by volume, a dehydrating ability of the gas mixture is insufficient. When it is more than 10 parts by volume, increase of the effect due to addition of such amount of $SiCl_4$ is not so remarkable.

When a gas mixture of the inert gas, the silicon halogenide and the halogen based gas is used as the dehydrating and purifying gas, 0.3 to 10 parts by volume of the silicon halogenide gas and 0.1 to 10 parts by volume of the halogen based gas are preferably used relative to 100 parts by volume of the inert gas. When the halogen based gas is contained more than 10 parts by volume, the SiC coating is degraded. When it is less than 0.1 part by volume, no effect of adding the halogen based gas is achieved. In any event, the addition of the halogen based gas further increases the dehydrating ability of the gas mixture.

A heating temperature at which the dehydrating and purifying treatment can be effectively carried out is in the range of 900° to 1200° C. When the heating temperature is lower than 900° C., the dehydration and purification are insufficient. When it is higher than 1200° C., the porous glass preform contracts whereby diffusion of the dehydrating and purifying gas into the preform inside and volatilization of impurities to be removed from the preform inside are suppressed.

In an alternative manner to prevent the degradation of SiC in the presence of the halogen based gas contained in the dehydrating and purifying gas, the porous glass preform is dehydrated and purified in a heating furnace having a quartz made muffle tube firstly, and then heated in the muffle tube coated with SiC. The quartz made muffle tube is not degraded by the halogen based gas such as $Cl_2$, but the temperature thereof cannot be lowered since crystallization happens at a temperature above 1200° C. as described above. In order to avoid the crystallization, the dehydrating and purifying treatment in the quartz made muffle tube is preferably performed at a temperature lower than 1100° C.

Next, the second aspect of the present invention is explained.

In a second aspect, the preform is preferably heated at a temperature of not higher than 1400° C. A silicon fluoride such as $SiF_4$, a carbon fluoride such as $CF_4$ or $SF_6$ can be used as the fluorine compound gas.

In the case where the porous glass preform is not vitrified by the fluorine doping treatment at a temperature not higher than 1400° C., the preform is again treated for vitrification at a temperature above 1400° C. under an atmosphere of only the inert gas, or the preform is vitrified while it is fluorine-doped under an atmosphere containing $SiF_4$ together with at least one of $Si_2F_6$ and $Si_3F_8$ at a temperature above 1400° C. In this way, the fluorine-doping treatment can be performed by using the SiC coated muffle tube without the degradation of the SiC layer.

Basic experiments and considerations to create the second aspect of the present invention will be hereinafter described in detail.

EXPERIMENT 4

A sintered SiC article having a diameter of 5 mm was heated at a temperature of 1450° C. under an atmosphere of $SiF_4$ gas. After 10 hour heating, a weight loss of the SiC article was 2.4%. When other fluorine compound gas was used instead of $SiF_4$, the weight loss was almost the same as in $SiF_4$.

EXPERIMENT 5

A sintered SiC article having the same size as in Experiment 4 was heated at a temperature of 1400° C. under an atmosphere of $SiF_4$ gas. After 50 hour heating, no weight loss of the SiC object was measured. When other fluorine gas was used instead of $SiF_4$, the same results as with $SiF_4$ were obtained.

EXPERIMENT 6

A sintered SiC article having the same size as in Experiment 4 was heated at a temperature of 1500° C. under an atmosphere of 91% by volume of $SiF_4$ and 9% by volume of $Si_2F_6$ for 50 hours, and no weight loss was determined.

EXPERIMENT 7

Experiment 6 was repeated except that the heating temperature was 1650° C. The article was heated for 10 hours and the weight loss thereof was 3%.

EXPERIMENT 8

Experiment 7 was repeated except that the gas contained 85% by volume of $SiF_4$, 10% by volume of $Si_2F_6$ and 5% by volume of $Si_3F_8$ was used. After 10 hour heating, no weight loss was determined.

In addition, it has been found that Si adheres to a low temperature portion of the muffle tube when the weight loss of the SiC article was observed.

From the results of the above Experiments 4 to 8, the following can be understood.

(1) SiC reacts with the fluorine compound gas at a temperature above 1400° C. However, by adding $Si_2F_6$ as a reactant gas to $SiF_4$, the reaction is suppressed.

(2) The gas mixture of $SiF_4$ and $Si_2F_6$ reacts with SiC at a further high temperature, but it does not react when $Si_3F_8$ is added to the gas mixture.

(3) The produced material through the reaction between SiC and $Si_yF_x$ is Si in the low temperature portion.

As a result, the reaction of SiC and the fluorine compound gas is suppressed at a temperature below 1400° C. Even at a temperature higher than 1400° C., the reaction of SiC with $SiF_4$ is suppressed by addition of $Si_2F_6$ and/or $Si_3F_8$. Thus, guidelines on preventing the degradation of SiC are indicated.

The above results can be explained as follows. The degradation reaction of SiC is expressed according to the following reaction equations:

$$SiC + 3SiF_4 \rightarrow 4SiF_3 \uparrow + C \quad (2)$$

$$SiC + SiF_4 \rightarrow 2SiF_2 \uparrow + C \quad (3)$$

Free energy changes $\Delta G$ in reactions of the above equations (2) and (3) are positive up to 1800° C. and reactions hardly proceed to the right hand side of the equations. However, in a gas flowing system as in a muffle tube of an electrical heating furnace, each equilibrium is shifted and the reaction proceeds to the left hand side a little. Therefore, the SiC coating is degraded a little. When the gas such as the reaction products $SiF_3$ and/or $SiF_2$ are added to the reaction system, the reaction equilibrium is kept and the degradation of the SiC coating is suppressed.

$Si_2F_6$ or $Si_3F_8$ forms $SiF_3$ or $SiF_2$· at a high temperature according to the following equations:

$$Si_2F_6 \rightarrow 2SiF_3· \quad (4)$$

$$Si_3F_8 \rightarrow 2SiF_3· + SiF_2· \quad (5)$$

The products $SiF_3$· and $SiF_2$· suppress the reactions (2) and (3).

The muffle tube preferably used in the present process has an inner layer made of a highly pure silicon carbide or has an inner and an outer layers each made of the highly pure silicon carbide.

The highly pure silicon carbide used for the muffle tube has preferably a purity of not less than 99.999% and preferably contains iron of not more than some ppm and copper of not more than 1 ppm.

The muffle tube in the heating furnace used in the present invention has the highly pure silicon carbide layer as its inner layer or as its inner and outer layers. The silicon carbide layer is preferably formed by a coating method with vapor phase reaction (CVD method) such as plasma CVD (PCVD) coating method or chemical CVD coating method since a highly pure and dense coating can be formed by such method.

A thickness of the highly pure silicon carbide coating can be selected depending on the operation temperature of the muffle tube and the atmosphere in the muffle tube. Generally, the coating has a thickness of at least 1 $\mu m$, preferably at least 5 $\mu m$, more preferably at least 25 $\mu m$, for example 50 $\mu m$.

Carbon, alumina or SiC sintered material can be exemplified as a material for the muffle tube substrate. The carbon material, especially a highly pure carbon material is preferred.

In the case where the highly pure carbon is used for the muffle tube substrate, the impurity of the carbon expressed as a total ash content is not more than 50 ppm, preferably not more than 20 ppm. For example, when the carbon has the ash content of more than 1000 ppm, it cannot be used for making the muffle tube substrate in view of the impurities such as iron and copper. The impurities and their amounts contained in the carbon having the total ash content of not more than 20 ppm are shown in the following Table:

TABLE 1

| | |
|---|---|
| B < 0.1 ppm | Ca < 0.1 ppm |
| Mg < 0.1 ppm | Ti < 0.1 ppm |
| Al < 0.1 ppm | V < 0.1 ppm |
| Si < 0.8 ppm | Cr < 0.1 ppm |
| P < 0.2 ppm | Fe < 0.1 ppm |
| S < 0.1 ppm | Cu < 0.1 ppm |
| Ni < 0.1 ppm | |

Figure 2:
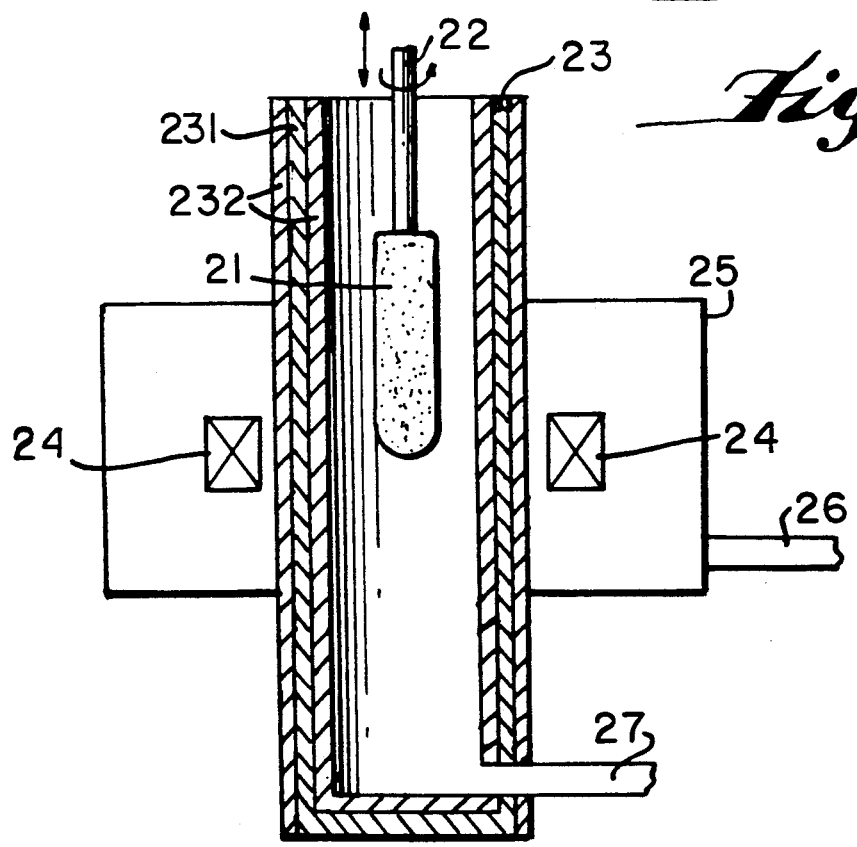

FIG. 2 schematically shows a sectional view of a heating furnace with which the present process is performed. In FIG. 2, the reference number 21 indicates a porous glass preform, 22 does a supporting rod for the preform, 23 does a muffle tube, 24 does a heater, 25 does a furnace body, 26 does an inlet for introducing an inert gas inside the furnace body and 27 does an inlet for introducing an atmosphere gas (for example, $SF_6$, helium and so on) into the muffle tube. The reference number 231 indicates a muffle tube substrate made of carbon, 232 does a coating layer of the highly pure silicon carbide. In the embodiment as shown in FIG. 2, the coatings of the highly pure silicon carbide are present as an inside layer and an outside layer of the muffle tube 23.

FIG. 3 schematically shows a sectional view of a heating furnace for the optical fiber preform which is also used in accordance with the present invention. In the embodiment shown in FIG. 3, is used a member 31 which is made of a heat resistant material having a small gas permeability such as a ceramic or a metal material and in which a muffle tube 23 is inserted in order to prevent penetration of a contaminant into the muffle tube through a wall thereof. At least an inner surface of the muffle tube 23 is coated with the highly pure carbon (not shown).

A material used for the member 31 is preferably the ceramic or the metal material having a nitrogen permeability in the order of $10^{-6}$ cm$^2$/sec. or less. Examples of the ceramic material are, in addition to silicon carbide, quartz glass, $Al_2O_3$, BN and so on.

In another embodiment of an heating furnace which is used in the present invention, a muffle tube comprises an upper portion, a middle portion and a lower portion which are detachably connected each other. At least the middle portion is made of the highly pure carbon, and the upper and the lower portion are made of a heat and corrosion resistant material.

One example of the above embodiment is schematically shown in FIG. 4. A heater 24 is located inside a heating furnace body 25. A muffle tube 23 comprises an upper portion 434, a middle portion 435 and a lower portion 436 and they are detachably connected each other by, for example, screwing. At least an inner surface of the middle portion 435 is coated with a layer 432 made of the highly pure silicon carbide. Since the upper portion 434 and the lower portion 436 are not subjected to so high temperature as in the middle portion 435, they are not necessarily made of such highly pure material as in the middle portion 435, but they only need to have the gas impermeabilities. Thus, although the upper and the lower portions are shown to have the layers 432 made of the highly pure silicon carbide as shown in FIG. 4, the layers are preferably made of a usual silicon carbide material from a view point of economy which does not have such high purity as the silicon carbide material as described above. For example, a silicon carbide material having a purity of 99.9% is satisfactory. In addition, since the upper and lower portions are heated at a temperature not higher than 1000° C., they may be made of a quartz material which is not resistant to a fluorine based gas. Even in such case, the contents of copper and iron, especially copper content should be taken into account and they are preferably not more than 0.1 ppm.

The muffle tube having the middle portion at least the inner surface of which is coated with the highly pure silicon carbide is suitably used in the present invention since it does not react with the halogen based gas such as $SiF_4$, $Si_2F_6$, $CF_4$ and $C_2F_6$, and it is highly heat resistant.

In the case where the heating furnace as shown in FIG. 2, 3 or 4 is used, a large amount of air around the muffle tube (or environmental operation atmosphere) penetrates into the muffle tube, when the glass preform is inserted in or removed from the muffle tube.

FIG. 5 schematically shows an apparatus which measures an amount of air inflow into a muffle tube comprising the muffle tube 51, an inlet 52 for introducing a purging gas, a sampling tube 53 for a gas in the muffle tube, a device 54 which measures an oxygen concentration in the gas and a pump 55. An inner diameter of the muffle tube 51 is 150 mm and a tip portion of the sampling tube is located at a position by 1 m from an opening of the muffle tube.

Figure 6:
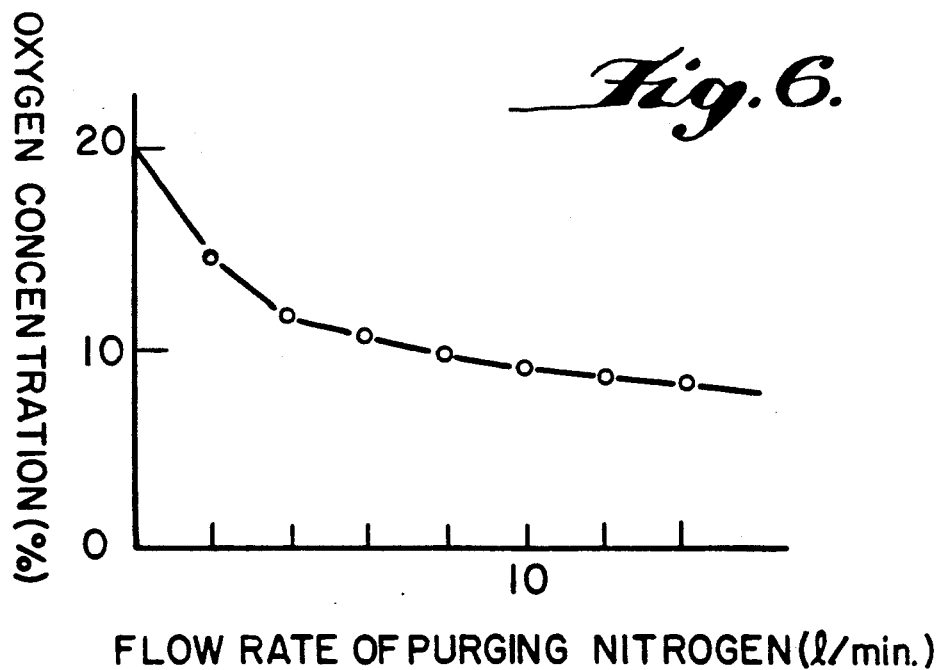
FIG. 6 shows results of oxygen measurements in one muffle tube with the measuring apparatus of FIG. 5.

Results of the oxygen concentration measurement carried out with respect to one embodiment with the above measuring device are shown in a graph in FIG. 6. As understood from the graph, the air around the muffle tube penetrates into the muffle tube and it is impossible to prevent the inflow of the air even when an amount of the purging nitrogen is increased.

The inflow of the air causes problems as follows: Firstly, inside of the muffle tube is contaminated with dusts in the air. The dusts comprises $SiO_2$, $Al_2O_3$, $Na_2O$, $Fe_2O_3$ and so on. Among them, $Al_2O_3$ and $Na_2O$ cause devitrification of the preform, and $Fe_2O_3$ causes increase of a transmission loss.

Such inflow of the air is prevented in an additional embodiment of the heating furnace in which the present invention is performed. The heating furnace comprises a heater, a muffle tube and a front chamber which previously or subsequently accommodates the glass preform before or after a thermal treatment of the preform, and from or in which the preform is inserted in or removed from the muffle tube.

Figure 7:
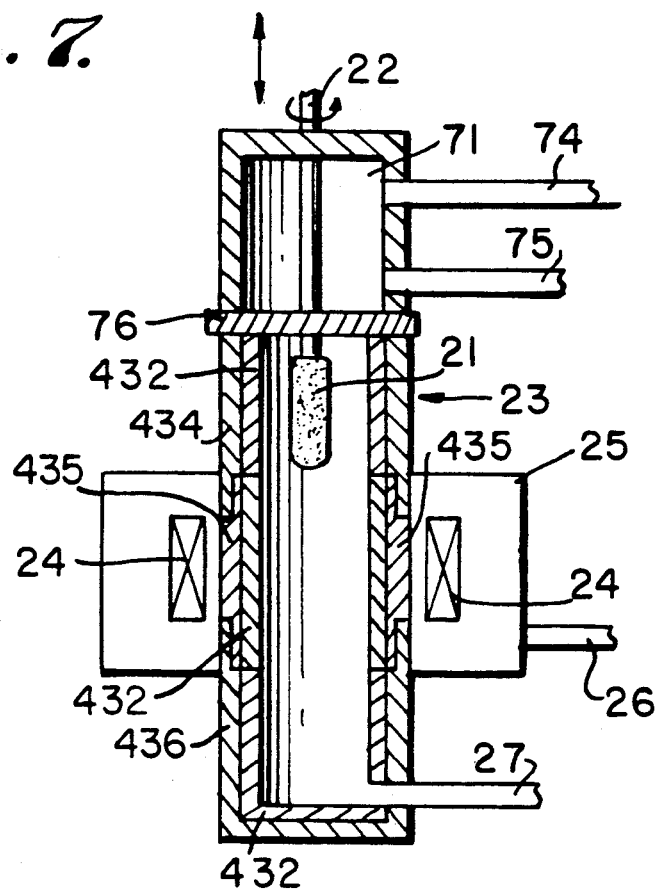

FIG. 7 schematically shows a heating furnace which is the same as that shown in FIG. 4 except that it comprises the front chamber 71. When the furnace is used, the glass preform 21 to be thermally treated is inserted in the front chamber 71 and a top cover (not shown) of the front chamber is closed. Then, nitrogen is supplied in the front chamber which is separated from the muffle tube 23 with a partition means 76 for nitrogen replacement. The partition means 76 is opened, the porous glass preform is inserted in the muffle tube 23 of which inside atmosphere has been previously replaced with a desired atmosphere gas, the partition means is closed and then the thermal treatment is initiated. After the thermal treatment, the partition means is opened, the partition means is closed after the glass preform is lifted from the muffle tube into the front chamber, and then the glass preform is removed from the front chamber after opening the top cover.

The front chamber is preferably constructed so that it can be evacuated to a pressure of $10^{-2}$ Torr and be heated to a temperature of 800° C. The front chamber is preferably made of a material which is heat resistant and which does not liberate any contaminant. For example, quartz glass, SiC, $Si_3N_4$ or BN is preferred for making the front chamber. The material of the chamber may the same as or different from that of the muffle tube.

When the front chamber is evacuated, for example a rotary pump may be used. In order to prevent a back flow of a pump oil, a trap cooled with liquid nitrogen may be located between the front chamber and the pump. A rotary installing mechanism having a magnetic seal is disposed at the top of the front chamber.

EXAMPLES

The present invention will be further described with the following examples.

EXAMPLE 1

A heating furnace comprising a muffle tube 23 having a SiC coating 232 in a thickness of 50 μm as shown in FIG. 2 was used. A porous glass preform 21 was inserted in the muffle tube at a temperature of 1100° C. 5 l/min. of He and 300 cc/min. of $SiCl_4$ were supplied in the muffle tube as the dehydrating and purifying gas. The preform was lowered and passed along a side portion of a heater 24 through the muffle tube at a lowering rate of 5 mm/min. and thereby the preform was dehydrated. Subsequently, the temperature of the furnace was raised to 1650° C. and the preform was again passed along the side portion of the heater at a rate of 2 mm/min. while supplying He at 5 l/min., whereby the preform was vitrified.

Figure 8:
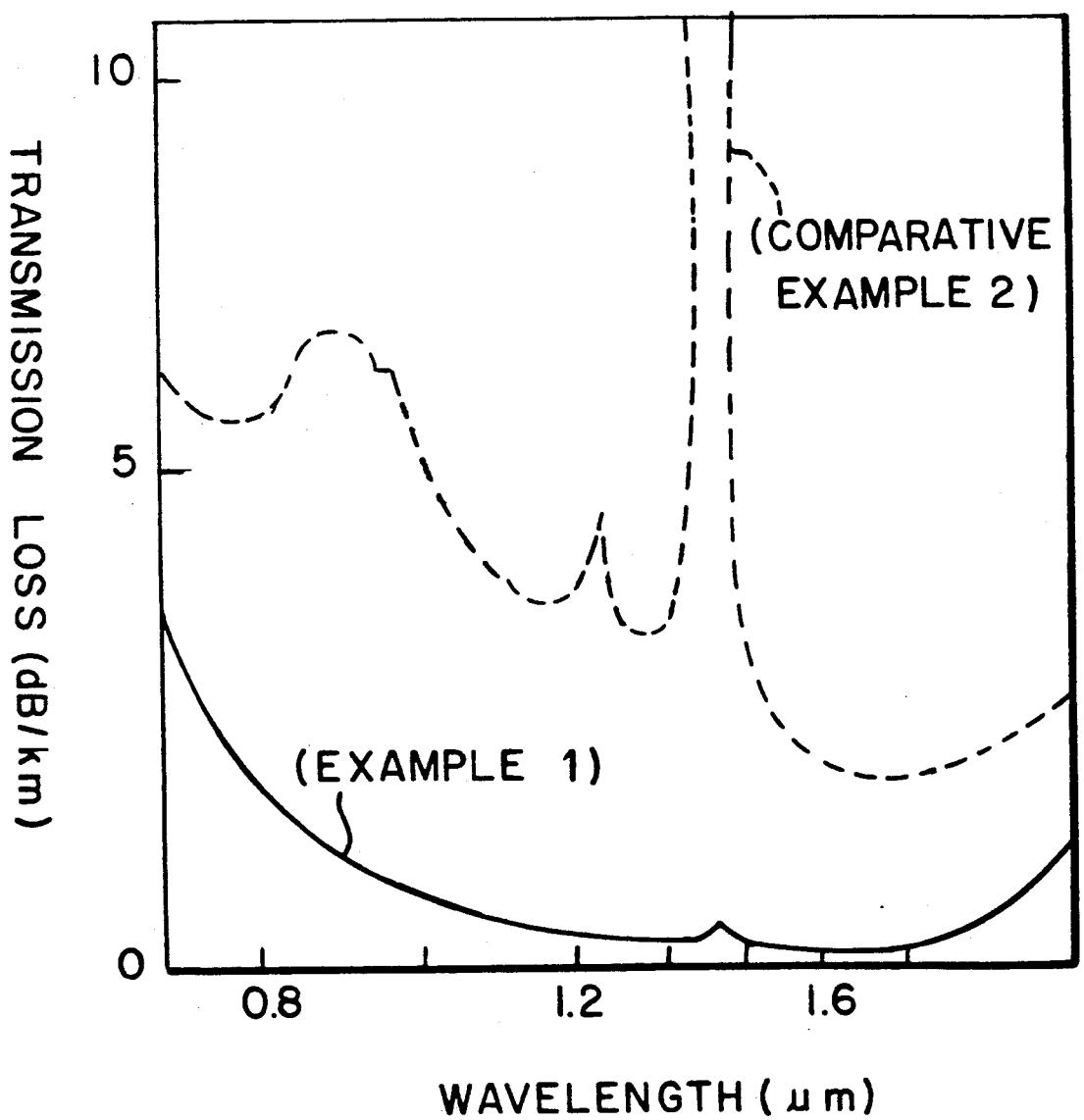
FIG. 8 shows a transmission loss of an optical fibers produced in Example 1 and Comparative Example 2.

An optical fiber was drawn from the glass preform obtained by the above treatment. A residual water content in the optical fiber was less than 10 ppb to show that substantially no water was present in the optical fiber. A transmission loss was measured and the results thereof showed no absorption increase of the optical fiber due to a transition metal such as Fe, Cu, Cr or Ni (see FIG. 8, curve I).

The above treatment was carried out to vitrify thirty preforms. After the thirtieth treatment, a surface of the muffle tube was observed. No degradation of the SiC coating was observed.

EXAMPLE 2

Example 1 was repeated except that a gas mixture consisting of 5 l/min. of He, 200 cc/min. of $SiCl_4$ and 50 cc/min. of $Cl_2$ was used as the dehydrating and purifying gas.

The surface of the muffle tube was observed after treating thirty preforms. No degradation of the SiC coating was observed as in Example 1.

COMPARATIVE EXAMPLE 1

Example 1 was repeated except that 5 l/min. of He and 200 cc/min. of $Cl_2$ were supplied as the dehydrating and purifying gas.

The treatment was carried out on ten preforms and an optical fiber was drawn from each preform. The water content of each optical fiber was determined and was as large as 0.2 to 1 ppm in the optical fibers drawn from the third to tenth preforms. The wavelength transmission loss characteristic of each optical fiber was measured and showed not only an absorption peak due to OH at 1.4 μm but also an absorption peak of 3 to 10 dB/km due to $Cu^{2+}$ at 0.85 μm (see FIG. 8, Curve II).

The surface of the muffle tube was observed after the treatment of the tenth preform. The SiC coating in a heating portion of the muffle tube was completely changed and green crystal of $CuCl_2$ was deposited on electrodes (made of copper) of the heater in the furnace body due to corrosion with $Cl_2$.

EXAMPLE 3

According to the present invention, a dehydrated porous glass preform was fluorine-doped in a heating apparatus as shown in FIG. 2.

The preform formed by VAD had been previously dehydrated in a quartz made muffle tube and contained $SiO_2$ as a main component. The preform had a diameter of 140 mm and a length of 500 mm. Details of this example were as follows:

The porous preform was inserted in the quartz made muffle tube at a temperature of 1000° C. under an atmosphere of He containing 5% of $Cl_2$ at a lowering rate of 5 mm/min. for dehydration. After the dehydration, the diameter and the length of the preform were the same as those before the dehydration.

The porous preform dehydrated as in the above was inserted in a muffle tube made of the highly pure carbon having the coating of SiC. The fluorine doping was carried out at a temperature of 1370° C. under an atmosphere of He containing 3% of $SiF_4$ at a lowering rate of 3 mm/min. Then, the temperature was raised to 1600° C. and the preform was vitrified under an atmosphere of He. The obtained preform had a diameter of 60 mm and a length of 300 mm. A refractive index of the glass preform was −0.34% expressed in terms of a specific refractive index difference from quartz glass.

A silica core single mode optical fiber was produced by using the preform and the transmission loss thereof was determined. The losses were 0.31 dB/km and 0.17 dB/km at wavelengths of 1.3 μm and 1.55 μm, respectively. No impurity was found and also no abnormal peak was observed after $H_2$ test (at 100° C. for 20 hours). Although temperature raising and lowering operations of the quartz made muffle tube were repeated, the muffle tube was not destroyed.

COMPARATIVE EXAMPLE 2

Example 3 was repeated to fluorine-dope of the porous preform which had been dehydrated in the quartz made muffle tube and to produce an optical fiber except that a muffle tube was made of a quartz glass containing 1 ppm of copper and comprised no carbon coating.

The residual water content in the produced fiber was 0.01 ppm. An absorption due to copper was present to about 1.30 μm, which was sufficiently small in comparison with that found in an optical fiber produced with the prior art technique. The absorption was 2 to 3 dB/km at a wavelength of 0.8 μm. However, an inner wall of the muffle tube was heavily etched, and the muffle tube had problematic corrosion resistance.

COMPARATIVE EXAMPLE 3

Heat Resistance of Quartz Made Muffle Tube

Example 3 was carried out repeatedly except that a quartz made muffle tube was used instead of the carbon made one. The muffle tube was highly stretched during the vitrification treatment and it could not be used again.

COMPARATIVE EXAMPLE 4

Etching of Quartz Made Muffle Tube

Comparative Example 3 was repeated except that $SF_6$ was used instead of $SiF_4$. The quartz made muffle tube was heavily etched and pin holes were found in a wall of the muffle tube near the heater. The glass preform contained water as much as in the order of some ppm. The stretch of the muffle tube was of course in remarkable extent and the muffle tube could not be used again.

EXAMPLE 4

Twenty glass preforms for an optical fiber were treated by using a heating furnace as shown in FIG. 2. The furnace comprised a carbon made muffle tube having the SiC coating in a thickness of 60 μm. The atmosphere of the treatment was $SiF_4/Si_2F_6/He = 3\%/0.3\%/96.7\%$ and the heating temperature was 1650° C. The obtained preform had a specific refractive index difference of −0.3% relative to quartz. After the treatment of the preforms, no degradation of the SiC coating was observed on the surface of the muffle tube.

EXAMPLE 5

By using an apparatus as in Example 4, twenty porous fluorine-doped glass preforms was vitrified under an atmosphere of $SiF_4/Si_2F_6/Si_3F_8/He = 3\%/0.3\%/0.1\%/96.6\%$ at a temperature of 1650° C. After the vitrifying treatment, the surface of the muffle tube was observed and no corrosion of the SiC coating was found.

A single mode optical fiber was produced from the obtained preform. The transmission losses of the optical fiber were 0.35 dB/km and 0.20 dB/km at wavelengths of 1.3 μm and 1.5 μm, respectively.

EXAMPLE 6

By using an apparatus as in Example 4, fifteen fluorine-doped glass preforms were vitrified under an atmosphere of $SiF_4/Si_3F_8/He = 3\%/0.1\%/96.9\%$ at a temperature of 1650° C. After the vitrifying treatment, the surface of the muffle tube was observed and no corrosion of the SiC coating was found.

A single mode optical fiber was produced from the obtained preform. The transmission losses of the optical fiber were 0.33 dB/km and 0.20 dB/km at wavelengths of 1.3 μm and 1.5 μm (not FIG. 8 but just like (quite similar to) FIG. 8), respectively.

COMPARATIVE EXAMPLE 5

When a carbon made muffle tube having a SiC coating in a thickness of 60 μm in a heating apparatus as shown in FIG. 2 was kept at a temperature of 1550° C. under an atmosphere of He containing 5% of $SiF_4$ for ten hours, the SiC coating was fully volatilized.

EXAMPLE 7

A carbon made muffle tube having an inner coating of the highly pure silicon carbide in a thickness of 50 μm formed by the CVD method was heated at a temperature of 1400° C. under an atmosphere of 160 ml/min. of $SiF_4$ and 10 l/min. of He. A porous glass preform was inserted in the muffle tube at a lowering rate of 3 mm/min. After the preform was passed along a side portion of the heater, the atmosphere gas was changed to 10 l/min. of He and the heater temperature was raised to 1650° C. The preform was again passed along the side portion of the heater at a rate of 15 mm/min.

The obtained preform had a refractive index difference of −0.33% relative to quartz. A single mode optical fiber having a diameter of 125 μm was produced from the preform. The residual water content of the optical fiber was 0.02 ppm and no increase of the transmission loss due to, for example, copper and iron was observed.

By using the same muffle tube, fifty glass preforms were treated. Although the inner SiC coating was reduced by 5 μm in a thickness, no increase of the transmission loss was observed.

COMPARATIVE EXAMPLE 6

Example 7 was repeated except that the carbon made muffle tube did not have the highly pure silicon carbide coating. $SiF_4$ highly leaked through a wall of the muffle to the outside and a concentration of HF near the muffle tube was increased to 1 to 5 ppm. The obtained preform had a water content of 1.5 ppm.

EXAMPLE 8

A porous glass preform was purified in a quartz made muffle tube at a temperature of 1100° C. under an atmosphere of $Cl_2/He = 0.3/10$ by volume. Then, the preform was vitrified at a temperature of 1350° C. under an atmosphere of 100% of $SiF_4$ and then at a temperature of 1500° C. and at an atmosphere of 100% of He in a muffle tube having an inner SiC coating in thickness of 50 μm formed by the CVD method. The obtained preform had a specific refractive index difference of −0.68% relative to quartz.

A pure silica core single mode optical fiber having a diameter of 125 μm was produced from the preform. The transmission loss of the optical fiber was 0.23 dB/km at a wavelength of 1.55 μm.

EXAMPLE 9

An apparatus comprising a carbon made muffle tube as shown in FIG. 7 was used. The muffle tube had silicon carbide coatings (purity 100%) formed by the CVD method on an inner and an outer surfaces. A glass preform 21 was inserted in the front chamber 71, the top cover was closed and the front chamber interior was replaced with nitrogen gas. Then, the preform was inserted in the muffle tube 23 after the partition means 76 was opened, and the partition means was closed. The preform was fluorine-doped as in Example 7.

When the preform was removed from the muffle tube, following procedures were carried out: The muffle tube interior was replaced with $N_2$ gas, the partition means was opened, the preform was lifted in the front chamber, the partition means was closed, and then the top cover was opened to remove the preform from the front chamber.

Seventy preforms were treated in accordance with the above procedures in one and a half months. A silica core single mode optical fiber having a diameter of 125 μm was produced from the obtained preform. An average transmission loss of the optical fiber was 0.180 dB/km at a wavelength of 1.55 μm.

COMPARATIVE EXAMPLE 7

By using a heating furnace as shown in FIG. 2, forty-five preforms were thermally treated in one month. The muffle tube had an outer and an inner coatings of silicon carbide each having a thickness of 50 μm formed by the CVD method (purity 100%). The preform was treated at a temperature of 1350° C. under an atmosphere of a $SiF_4$ containing gas.

A silica core single mode fiber was produced from each obtained preform. An average transmission loss of the optical fibers produced from the first preform to the thirtieth preform was 0.183 dB/km at a wavelength of 1.55 μm. An average transmission loss of the optical fibers produced from the thirty-first preform to the last preform was as rather large as 0.195 dB/km at a wavelength of 1.55 μm.

A sodium content in the preform was measured by atomic-absorption spectroscopy. The Na content was less than 20 ppb by weight in the tenth preform, and 150 to 200 ppb by weight in the last preform. This may be because of entry of dusts in the air around the muffle tube.

Therefore, when the apparatus comprising the front chamber is used, the better preform can be stably formed for a long period.

EXAMPLE 10

A heating furnace as shown in FIG. 2 was used. The muffle tube in the furnace had an outer and an inner coatings of silicon carbide (purity 100%) formed by the CVD method each having a thickness of 50 μm. A porous glass preform was heated at a temperature of 1050° C. under an atmosphere gas of 300 cc/min. of $SiCl_4$ and 10 l/min. of He at a lowering rate of 10 mm/min. After the preform was passed along a side portion of the heater, the atmosphere gas was changed to 160 cc/min. of $SiF_4$ and 10 l/min. of He and the heater temperature was raised to 1400° C. The preform was again passed along the side portion of the heater at a rate of 3 mm/min. Then, the gas was changed to 10 l/min. of He and the heater temperature was raised to 1700° C. The preform was moved at a rate of 20 mm/min. to be vitrified.

The obtained preform had a specific refractive index difference of −0.32% relative to quartz. A pure silica core single mode optical fiber having a diameter of 125 μm was produced from the preform. The transmission loss of the fiber was 0.178 dB/km at a wavelength of 1.55 μm.

EXAMPLE 11

By using the same apparatus as in Example 10, a glass preform consisting of a silica core containing 10% of $GeO_2$ and a cladding of pure silica was thermally treated for dehydration and vitrification.

An optical fiber having a diameter of 125 μm was produced from the obtained preform. The transmission loss of the fiber was 0.35 dB/km at a wavelength of 1.3 μm.

EXAMPLE 12

In a heating furnace as shown in FIG. 3, a carbon tube 31 having a silicon carbide coating (purity 100%) on its surface was used as an inserted member in a muffle tube 23. The coating was 50 μm in thickness and formed by the CVD method. An impurity content of the member was less than 5 ppm by weight.

$SiF_4$ and He were supplied in the muffle tube at rates of 160 cc/min. and 10 l/min., respectively. 20 l/min. of $N_2$ was introduced in the annular space between the muffle tube and the member. The muffle tube was heated to a temperature of 1400° C. and a porous preform 21 was passed along a side portion of the heater 24 at a lowering rate of 3 mm/min. to be fluorine-doped.

Then, the muffle tube was heated to a temperature of 1650° C. and the gas to be supplied in the muffle tube was changed to 10 l/min. of He. The gas to be supplied in the annular space remained unchanged. The preform was again passed along the side portion of the heater at a lowering rate of 15 mm/min. to be vitrified.

A pure silica core single mode optical fiber having a diameter of 125 μm was produced from the preform. The transmission loss of the fiber was 0.178 to 0.181 dB/km at a wavelength of 1.55 μm.

EXAMPLE 13

A heating furnace as shown in FIG. 2 was used. A muffle tube in the furnace had an outer and an inner coatings of the high purity silicon carbide (purity 100%) formed by the CVD method each having a thickness of 50 μm. As in Example 12, seventy preforms were treated.

A pure silica core single mode optical fiber having a diameter of 125 μm was produced from each preform. The transmission loss of the optical fiber highly scattered in the range of 0.182 to 0.195 dB/km at a wave length of 1.55 μm.

As explained with reference to Examples and Comparative Examples, when the muffle tube having the coating of SiC is used in accordance with the present process, the preform for the optical fiber having substantially no water and substantially no impurity can be stably formed so that the optical fiber having a less transmission loss can be drawn from such preform.

In addition, since the muffle tube does not destroy due to the temperature lowering operation in comparison with the conventional quartz made muffle tube, the muffle tube can be economically and stably used for a long period.

We claim:

1. A heating process for the dehydrating and purifying of a porous glass preform for an optical fiber comprising passing the porous glass preform through a muffle tube at a high temperature in an atmosphere comprising an inert gas and a silicon tetrachloride, wherein said tube comprises at least one of carbon, alumina, and SiC sintered material and said tube forms a cavity having an opening at one end through which said porous glass preform passes into said tube and the surface of the tube exposed to the silicon tetrachloride is a SiC layer.

2. The process according to claim 1, wherein the atmosphere further comprises a chlorine gas.

3. The process according to claim 2, wherein a volume percentage ratio of the chlorine gas to the inert gas is from 0.1 to 10 percent and a volume percentage ratio of the silicon tetrachloride gas to the inert gas is from 0.3 to 10 percent.

4. The process according to claim 1, wherein a volume percentage ratio of the silicon tetrachloride to the inert gas is from 0.3 to 10 percent.

5. The process according to claim 1, wherein a heating temperature of the preform is in the range of 800° to 1200° C.

6. The process according to claim 1, wherein the SiC layer has a purity expressed in terms of a total ash content of not more than 50 ppm.

7. The process according to claim 1, wherein the SiC layer is formed with a method selected from the group consisting of PCVD coating method and CVD coating method.

8. The process according to claim 1, the SiC layer has a thickness of not less than 1 μm.

* * * * *